United States Patent [19]

Green

[11] 4,252,593
[45] * Feb. 24, 1981

[54] METHOD OF PREPARING REINFORCED COMPOSITES

[75] Inventor: George E. Green, Stapleford, England

[73] Assignee: Ciba-Geigy Corporation, Ardsley, N.Y.

[ * ] Notice: The portion of the term of this patent subsequent to May 30, 1995, has been disclaimed.

[21] Appl. No.: 908,328

[22] Filed: May 22, 1978

Related U.S. Application Data

[63] Continuation of Ser. No. 767,269, Feb. 10, 1977, abandoned.

[30] Foreign Application Priority Data

Feb. 19, 1976 [GB] United Kingdom ............... 6575/76

[51] Int. Cl.$^2$ .................... B29C 19/02; C09J 5/00
[52] U.S. Cl. ................... 156/231; 156/246; 156/249; 156/330; 204/159.15; 427/44; 427/386; 428/290; 428/302; 428/413; 156/235; 156/272; 156/182; 156/307.5
[58] Field of Search ............ 156/246, 330, 272, 249; 96/115 P; 427/44, 54, 53, 386; 428/286, 302, 290, 413; 260/836, 837 R; 204/159.15

[56] References Cited

U.S. PATENT DOCUMENTS

| | | | |
|---|---|---|---|
| 3,373,075 | 3/1968 | Fekete et al. | 156/330 |
| 3,509,270 | 4/1970 | Dube et al. | 29/625 |
| 3,551,246 | 12/1970 | Bassemir et al. | 156/272 |
| 3,625,744 | 12/1971 | Juna et al. | 427/53 |
| 3,658,620 | 4/1972 | Hall | 156/272 |
| 3,674,545 | 7/1972 | Strolle | 427/386 |
| 3,784,433 | 1/1974 | Garnish et al. | 156/330 |
| 3,929,545 | 12/1975 | Van Dyck et al. | 156/272 |
| 3,935,330 | 1/1976 | Smith et al. | 204/159.19 |
| 3,989,610 | 11/1976 | Tsukada et al. | 427/54 |
| 4,092,443 | 5/1978 | Green | 427/54 |

FOREIGN PATENT DOCUMENTS 50-107500 8/1975 Japan .

*Primary Examiner*—John J. Gallagher
*Attorney, Agent, or Firm*—Harry Falber

[57] ABSTRACT

A method for the preparation of prepregs comprises
(i) exposing to actinic radiation a layer of a liquid composition containing an epoxide resin, a photopolymerizable compound and a heat-activated curing agent for epoxide resins until the said composition solidifies to form an essentially solid continuous film due to photopolymerization of the said photopolymerizable compound while the epoxide resin remains substantially in the thermosettable state, and
(ii) bringing together the film so formed and fibrous reinforcing material under conditions such that the said film flows about the fibers and the components of the said film and the fibers form a coherent structure.

Preferably the liquid composition also contains a dual-functional substance which has in the same molecule both an epoxide group and a dissimilar group through which the substance can be photopolymerized.

The prepreg, optionally after shaping and/or heating, is heated to cure the epoxide resin and, if used, the photopolymerized dual-functional substance.

21 Claims, No Drawings

METHOD OF PREPARING REINFORCED COMPOSITES

This is a continuation of application Ser. No. 767,269, filed on Feb. 10, 1977, now abandoned.

BACKGROUND OF THE INVENTION

This invention relates to a method for the production of reinforced composites from compositions which are photopolymerisable and thermosettable and from fibrous reinforcing materials, and to the composites obtained by this method.

Composite structures are commonly made by impregnating fibrous materials, such as paper, glass, and carbon fibres, with a solution of a solid thermosettable resin and a heat-activated curing agent for the resin, causing the resin to solidify by evaporation of the solvent, and, when desired, curing the resin composition by the action of heat. Composite structures may also be prepared from films of a thermosettable resin composition by the method described in British Pat. No. 1,299,177, which comprises laying a film of the resin composition on a fibrous reinforcement and applying heat and pressure so that the resin composition flows about the fibres but remains curable, and then heating further when desired so that the resin composition is cured by the heat-activated curing agent. The latter procedure is particularly convenient when unidirectional fibrous reinforcement is to be used, especially if the fibres are short and/or light, because there is less tendency for the fibres to become displaced and the reinforcing effect thereby become irregularly distributed. Both these methods suffer from certain drawbacks. If a solvent is used, it is not always possible to eliminate all traces of it before the final curing takes place, and in consequence the final composite may contain voids caused by evaporation of such residual solvent. Further, use of solvents may cause difficulties due to their toxicity or inflammability or to pollution. When a film adhesive is used, it is usually cast from a liquid thermosettable resin and this then advanced to the solid state, and such a process adds considerably to the cost of the composite. Both methods also require a considerable expenditure of heat energy, either to evaporate the solvents or to advance the resin.

DETAILED DISCLOSURE

We have now found a method by which fibrous reinforced composites containing heat-curable resin ("prepregs") may be made without the inconvenience just mentioned of the prior art methods. In this novel method, a liquid composition, containing an epoxide resin and a photopolymerisable compound, is photopolymerised to form an essentially solid continuous film by exposure to actinic radiation, optionally in the presence of a catalyst for the photopolymerisation, but without thermally crosslinking it; the film so obtained is then contacted with fibrous reinforcing material, usually with the application of heat and/or pressure, such that a coherent structure is formed. The period of heating can be very short, as there need be no solvent to evaporate and the films need not be thick. It is not necessary to convert immediately the photopolymerised composition distributed on the fibrous reinforcing material into the fully cured, insoluble, and infusible C-stage; often, it can be changed into the still fusible B-stage, or remain in the A-stage, and, when desired, e.g., after the prepreg has been formed into some desired configuration, fully cured by heating to form the reinforced composite.

The present invention accordingly provides a method for the preparation of prepregs which comprises (i) in the absence of a substance which gives rise to a substantial degree of photoinduced polymerisation through consumption of epoxide groups, exposing to actinic radiation a layer of a liquid composition containing an epoxide resin, a photopolymerisable compound, and a heat-activated curing agent for epoxide resins until the said composition solidifies to form an essentially solid continuous film due to photopolymerisation of the said photopolymerisable compound while the epoxide resin remains substantially in the thermosettable state, and (ii) bringing together the film so formed and fibrous reinforcing material under conditions such that the said film flows about the fibres and the components of the said film and the fibres form a coherent structure.

There are also provided prepregs prepared by the method of this invention.

Other aspects of this invention provide a method of preparing a reinforced composite which comprises heat-curing a photopolymerised, but still thermosettable, prepreg of this invention, and reinforced composites prepared by this method.

The reinforcement may be in the form of woven or non-woven cloth, unidirectional lengths, or chopped strands and may be of natural or synthetic fibres, including strands and filaments, especially glass, boron, stainless steel, tungsten, silicon carbide, asbestos, an aromatic polyamide such as poly(m-phenylene isophthalamide) or poly(p-phenylene terephthalamide), or carbon.

Compositions used to prepare the films of the present invention must be liquid under the conditions used in making the films but are preferably solvent-free.

Epoxide resins, i.e., substances containing more than one 1,2-epoxide group per average molecule, suitable for use in the present invention are preferably those containing groups of formula

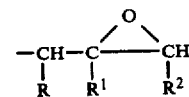

directly attached to atoms of oxygen, nitrogen, or sulphur, where either R and $R^2$ each represent a hydrogen atom, in which case $R^1$ denotes a hydrogen atom or a methyl group, or R and $R^2$ together represent $-CH_2CH_2-$, in which case $R^1$ denotes a hydrogen atom.

As examples of such resins may be mentioned polyglycidyl and poly(β-methylglycidyl) esters obtainable by reaction of a compound containing two or more carboxylic acid groups per molecule with epichlorohydrin, glycerol dichlorohydrin, or β-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)-methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —CH₂CH₂— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo[6.2.1.0²,⁷.0³,⁵]-undec-9-yl glycidyl ether, the bis(4-oxatetracyclo[6.2.1.0²,⁷.0³,⁵]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide resins may be used.

Especially preferred epoxide resins, which may have been advanced, used in the process of this invention are diglycidyl ethers of dihydric phenols such as 2,2-bis(4-hydroxyphenyl)propane and bis(4-hydroxyphenyl)methane and of dihydric alcohols such as of butane-1,4-diol, and N,N'-diglycidyl derivatives of hydantoins, such as 1,3-diglycidyl-5,5-dimethylhydantoin.

The photopolymerisable compound used in the process of the present invention may be of any chemical type known to polymerise under the influence of actinic radiation. Such materials are described in, for example, Kosar, "Light-sensitive Systems: Chemistry and Applications jof Non-Silver Halide Photographic Processes," Wiley, New York, 1965.

As is well known, these materials fall into two main classes (a) those which are polymerised through a free-radical chain reaction (photoinitiated polymerisation) and (b) those in which polymerisation is effected by reaction of an excited molecule of the monomer with another molecule of the monomer.

The first type require only one photopolymerisable group per molecule to form long chains on polymerisation while the second type must have at least two photopolymerisable groups per molecule, since if they have only one such group per molecule they will dimerise, but not polymerise, on irradiation.

Photopolymerisable substances of the first type preferred for use in this invention have one ethylenic linkage, or more than one providing they are unconjugated. Examples of these substances are acrylic esters containing at least one group of the general formulae II, III, or IV

$$CH_2=C(R^3)COO- \qquad \qquad II$$

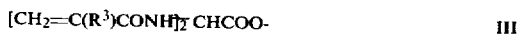
$$[CH_2=C(R^3)CONH]_2CHCOO- \qquad III$$

$$CH_2=C(R^3)CONHCH(OH)CH_2COO- \qquad IV$$

where $R^3$ is a hydrogen, chlorine, or bromine atom, or an alkyl hydrocarbon group of 1 to 4 carbon atoms, especially a hydrogen atom or a methyl group. Other examples are styrene and crotonic acid.

Photopolymerisable materials of the second type include those having at least two, and preferably three or more, groups which are azido, coumarin, stilbene, maleimide, pyridinone, chalcone, propenone, pentadienone, or acrylic acid groups which are substituted in their 3-position by groups having ethylenic unsaturation or aromaticity in conjugation with the ethylenic double bond of the acrylic group.

Examples of suitable azides are those containing at least two groups of the formula

$$N_3-Ar- \qquad \qquad V$$

where Ar denotes a mononuclear or dinuclear aromatic radical containing in all from 6 to at most 14 carbon atoms, especially a phenylene or naphthylene group.

Examples of suitable coumarins are those containing groups of the formula

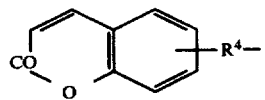

where $R^4$ is an oxygen atom, a carbonyloxy group (—COO—), a sulphonyl group, or a sulphonyloxy group.

Examples of those containing stilbene groups are those containing groups of the formula

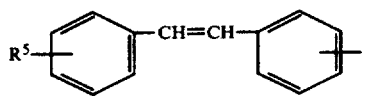

VII where $R^5$ is the residue, containing up to 8 carbon atoms in all, of a five to six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus, such as a benzimidazlyl, benzoxazolyl, benzotriazolyl, benzothiazolyl, or a naphthotriazolyl residue.

Examples of those containing maleimide units are those having groups of the formula

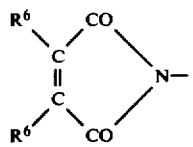

VIII where each $R^6$ is an alkyl group of 1 to 4 carbon atoms, a chlorine atom, or a phenyl group, especially a methyl group.

Examples of those containing pyridinone units are those having groups of the formula

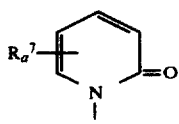

IX where
$R^7$ is an aliphatic or cycloaliphatic radical of 1 to 8 carbon atoms, and
a is zero or an integer of 1 to 4.

Examples of compounds containing chalcone, propenone, and pentadienone groups are those containing structures of formula

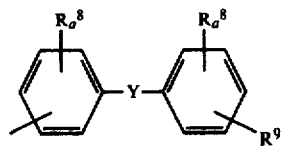

X or

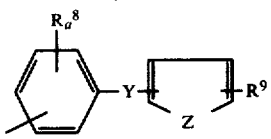

XI where
each $R^8$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulphonic, or phosphoric acid group in the form of a salt,
a has the meaning previously assigned,
$R^9$ represents a valency bond or a hydrogen atom,
Y represents a chain of carbon atoms containing in that chain a grouping of formula $$\left[-CH=C{\overset{R^{10}}{\underset{|}{}}}-\right]_b -\overset{O}{\underset{||}{C}}-\left[-\overset{R^{11}}{\underset{|}{C}}=CH-\right]_c$$

XII or

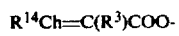

XIII

XIV $R^{10}$ and $R^{11}$ are each individually a hydrogen atom, an alkyl group, e.g., of 1 to 4 carbon atoms, or an aryl group, preferably a mononuclear group such a phenyl group, or $R^{10}$ and $R^{11}$ conjointly denote a polymethylene chain of 2 to 4 methylene groups,
$R^{12}$ and $R^{13}$ are each a hydrogen atom, an alkyl group, e.g., of 1 to 4 carbon atoms, or an aryl group, preferably a mononuclear group such as a phenyl group,
b and c are each zero, 1, or 2, with the proviso that they are not both zero, and
Z is an oxygen or sulphur atom.

Suitable 3-substituted acrylates contain groups of the general formula $$R^{14}Ch=C(R^3)COO-$$

XV where
$R^{14}$ is an aliphatic or mononuclear aromatic, araliphatic, or heterocyclyl group which, as already indicated, has ethylenic unsaturation of aromaticity in conjunction with the ethylenic double bond shown, such as a phenyl, 2-furyl, 2- or 3-pyridyl, prop-2-enyl, or styryl group, and
$R^3$ has the meaning previously assigned.

Specific examples are disorbates of poly(oxyethylene) glycols and poly(oxypropylene) glycols.

If desired, a mixture of photopolymerisable compounds may be used. Especially preferred photopolymerisable compounds used in the process of this invention are esters of acrylic acid which are of any of the following general formulae XVI to XX.

Formula XVI is

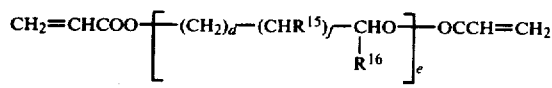

where
d is an integer of 1 to 8,
e is an integer of 1 to 20,
f is zero or 1,
$R^{15}$ denotes —H, —OH, or —OOCCH=CH$_2$, and
$R^{16}$ denotes —H, —CH$_3$, —C$_2$H$_5$, —CH$_2$OH, or —CH$_2$OOCCH=CH$_2$.

Examples of compounds of formula XVI are triethylene glycol diacrylate and tetraethylene glycol diacrylate.

Formula XVII is

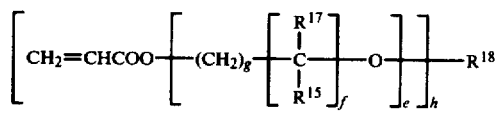

where
e, f, and $R^{15}$ have the meanings assigned above,
g is zero or a positive integer, provided that f and g are not both zero,
h is 1, 2, 3, or 4,
$R^{17}$ denotes —H, —Cl, —CH$_3$, or —C$_2$H$_5$, and
$R^{18}$ denotes an organic radical of valency h linked through a carbon atom or carbon atoms thereof to the indicated h terminal oxygen atoms, preferably the hydrocarbon residue of an aliphatic alcohol containing from 1 to 6 carbon atoms, such as —CH$_3$ or

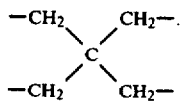

Formula XVIII is

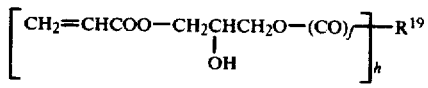

where
f and h have the same meanings previously assigned, and
$R^{19}$ denotes an organic radical of valency h, linked through a carbon atom thereof other than the carbon atom of a carbonyl group.

More particularly, when f is zero,
$R^{19}$ may denote the residue, containing from 1 to 18 carbon atoms, of an alcohol or phenol having h hydroxyl groups.

$R^{19}$ may thus represent, for example an aromatic group (which may be substituted in the ring by alkyl groups), an araliphatic, cycloaliphatic, heterocyclic, or heterocycloaliphatic group, such as an aromatic group containing only one benzene ring optionally substituted by chlorine or by alkyl groups each of from 1 to 9 carbon atoms, or an aromatic group comprising a chain of two benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 6 carbon atoms, or, preferably, a saturated or unsaturated, straight or branched-chain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae —C$_6$H$_5$ and —C$_6$H$_4$CH$_3$, in which case h is 1, —C$_6$H$_4$C(CH$_3$)$_2$ C$_6$H$_4$—, and —C$_6$H$_4$CH$_2$C$_6$H$_4$—, in which case h is 2, and —C$_6$H$_4$(CH$_2$C$_6$H$_3$+jCH$_2$C$_6$H$_4$— where j is 1 or 2, in which case h is 3 or 4, and the aliphatic groups of formula

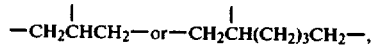

in which case h is 3, of formula —(CH$_2$)$_4$—, —CH$_2$CH=CHCH$_2$—, —CH$_2$CH$_2$OCH$_2$CH$_2$—, or —(CH$_2$CH$_2$O)$_2$CH$_2$CH$_2$—, in which case h is 2, or of the formula —(CH$_2$)$_3$CH$_3$, —(CH$_2$)$_4$OH, —CH$_2$CH=CH$_2$, —(CH$_2$)$_2$OH, —CH$_2$CH(CH$_3$)OH, or —CH$_2$CH=CHCH$_2$OH, in which case h is 1.

When f is 1, $R^{19}$ may represent the residue, containing from 1 to 60 carbon atoms, of an acid having h carboxyl groups, preferably a saturated or ethylenically-unsaturated, straight chain or branched aliphatic hydrocarbon group of from 1 to 20 carbon atoms, which may be substituted by chlorine atoms and which may be interrupted by ether oxygen atoms and/or by carbonyloxy groups, or a saturated or ethylenically-unsaturated cycloaliphatic or aliphatic-cycloaliphatic hydrocarbon group of at least 4 carbon atoms, which may be substituted by chlorine atoms, or an aromatic hydrocarbon group of from 6 to 12 carbon atoms, which may be substituted by chlorine atoms.

Further preferred are such compounds in which $R^{19}$ represents a saturated or ethylenically-unsaturated straight chain or branched aliphatic hydrocarbon group of from 1 to 8 carbon atoms, optionally substituted by a hydroxyl group, or a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula —CH$_3$, —CH$_2$CH$_3$, —CH$_2$CH(OH)CH$_3$, —CH$_2$Cl, and —C$_6$H$_5$, in which case h is 1, and —CH$_2$CH$_2$—, —CH=CH—, and —C$_6$H$_4$—, in which case h is 2.

Specific examples of suitable compounds of formula XVIII are 1,4-bis(2-hydroxy-3-(acryloxy)propoxy)butane, a poly(2-hydroxy-3-(acryloxy)propyl) ether of a phenol-formaldehyde novolak, 1-(2-hydroxy-3-acryloxypropoxy)-butane, -n-octane, and -n-decane, bis(2-hydroxy-3-acryloxypropyl) adipate, 2-hydroxy-3-acryloxypropyl propionate and 3-phenoxy-2-hydroxypropyl acrylate.

Formula XIX is

where $R^{20}$ denotes $CH_3-$, $C_2H_5-$, or $-CH_2OOCCH=CH_2$.

Examples of such acrylates are pentaerythritol tetraacrylate and 1,1,1-trimethylolpropane triacrylate.

Formula XX is

where $R^{21}$ denotes either an alkyl group of 1 to 6 carbon atoms, optionally substituted by one hydroxyl group, or a dialkylaminoalkyl group containing in all 3 to 12 carbon atoms, such as ethyl, n-propyl, n-butyl, 2-hydroxyethyl, 2-hydroxypropyl, and diethylaminoethyl groups.

The molar ratio of epoxide resin to photopolymerisable compound is such that there is sufficient of each present to form both a satisfactory prepreg and a satisfactorily cured composite. Usually the molar ratio is from 10:1 to 1:10, and especially from 5:1 to 1:5.

The photopolymerisable compound may be free from any 1,2-epoxide group. On the other hand the liquid compositions used may also contain a substance having in the same molecule at least one 1,2-epoxide group and at least one dissimilar (i.e., not 1,2-epoxide) group through which the substance can be polymerised by means of actinic radiation (called hereinafter a "dual-functional substance").

Suitable dual-functional substances may be made by introducing photopolymerisable groups (i.e., groups through which polymerisation can be induced by means of actinic radiation) into a compound which already contains one or more 1,2-epoxide groups or, conversely, by introducing one or more 1,2-epoxide groups into a compound which already contains one or more photopolymerisable groups.

A convenient method of introducing photopolymerisable groups into a compound which already contains epoxide groups comprises reaction of an at least diepoxide with a stoichiometric deficit, based on the epoxide group content, of a compound containing both a photopolymerisable group and also a group, such as a carboxylic acid, phenolic or alcoholic hydroxyl, or imido group, capable of reaction with a 1,2-epoxide group so as to introduce at least one photopolymerisable group into the molecule.

It will be understood that this method does not usually give rise to more than a 50% yield of dual-functional material. Thus, taking acrylic acid as an example of a compound containing both a group through which it can be polymerised (the ethylenic unsaturation) and a group capable of reaction with a 1,2-epoxide group (the carboxylic acid group), reaction of a diepoxide with 0.5 mol of acrylic acid per epoxide group affords a product which, on a statistical basis, can be considered to comprise 50 mol-% of the epoxide-acrylate, 25 mol-% of the diacrylate, and 25 mol-% of unchanged diepoxide. Clearly, with lesser or greater amounts of acrylic acid, there would be obtained lesser or greater amounts of the diacrylate and the diepoxide but a lesser amount of the epoxide-acrylate. The dual-functional material, is, of course, accompanied by both photopolymerisable material (the diacrylate in this case) and a thermosetting material (the diepoxide).

Usually, from 10 to 50 mol-% of the dual-functional material is employed, calculated on the combined mols. of epoxide resin and the said photopolymerisable compound.

Examples of classes of compounds containing a photopolymerisable group and also a carboxylic acid group are acrylic, and acrylamido-substituted carboxylic, acids; azidoaromatic acids; carboxyl-substituted stilbene derivatives such as stilbenebenzimidazoles, stilbenebenzoxazoles, stilbenebenzotriazoles, stilbenenaphthotriazoles, and stilbenebenzothiazoles; carboxyl-containing maleimides, where the two ethylenic carbon atoms of the maleimide ring are substituted by alkyl groups of 1 to 4 carbon atoms, phenyl groups, or chlorine atoms; and also acrylic acids substituted in the 3-position by groups having ethylenic unsaturation or aromaticity in conjugation with the ethylenic bond in the 2,3-position. Examples of classes of compound containing a photopolymerisable group and also a phenolic hydroxyl group are hydroxy-substituted chalcones and hydroxyphenyl-substituted propenones and pentadienones. Examples of classes of compounds containing a photopolymerisable group and also an alcoholic hydroxyl group are hydroxy-substituted maleimides and hydroxy-substituted pyridinones. Examples of classes of compounds containing a photopolymerisable group and an imido group are disubstituted maleimides, where the two ethylenic carbon atoms of the maleimide ring are substituted as specified above.

Suitable acrylic, and acrylamido-substituted carboxylic, acids are of the general formula

  XXI or

  XXII or

  XXIII where $R^3$ has the meaning previously assigned.

Suitable azidoaromatic acids are 4-azidobenzoic acid and other compounds of formula

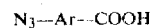  XXIV where Ar has the meaning previously assigned.

Suitable carboxyl-containing stilbene derivatives are 4-(1-methylbenzimidazol-2-yl)stilbene-4'-carboxylic acid, 4-(2H-naphtho[1,2-d]triazol-2-yl)stilbene-4'-carboxylic acid, and other compounds of the general formula

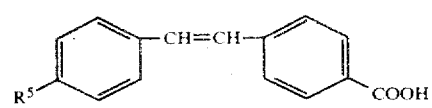  XXV where $R^5$ has the meaning previously assigned.

Suitable carboxyl-containing maleimides are N-(carboxyphenyl)-dimethylmaleimide and other compounds of the general formula

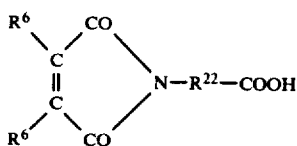

XXVI where
each $R^6$ has the meaning previously assigned, and
$R^{22}$ denotes the residue, containing up to 8 carbon atoms, of an aromatic, aliphatic, or cycloaliphatic aminocarboxylic acid after removal of a primary amino group and a carboxylic acid group.

Suitable hydroxy-substituted chalcones and hydroxyphenyl-substituted propenones and pentadienones are 1-(4-hydroxyphenyl)-3-oxo-3-phenylprop-1-ene, 1-(4-hydroxyphenyl)-1-oxo-3-phenylprop-2-ene, 1-(2-furyl)-3-oxo-3-(4-hydroxyphenyl)prop-1-ene, and other compounds of the general formula

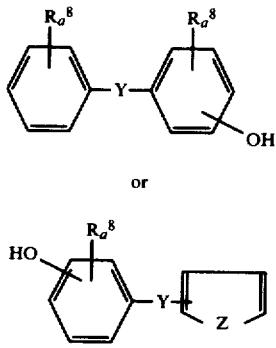

XXVII or

XXVIII where
each $R^8$, a, and Y have the meaning previously assigned.

Suitable hydroxy-substituted maleimides and hydroxy-substituted pyridinones are N-(2-hydroxyethyl)-dimethylmaleimide and 4,6-dimethyl-1-(2-hydroxyethyl)pyridin-2-one, and other compounds of the general formula

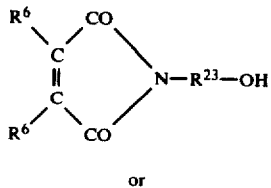

XXIX or

XXX where
each $R^6$, and $R^7$ and a have the meaning previously assigned and,
$R^{23}$ denotes the residue, of not more than 8 carbon atoms, of an aliphatic or cycloaliphatic aminoalcohol after removal of an amino group and an alcoholic hydroxyl group.

Suitable imides are dimethylmaleimide and other compounds of the general formula

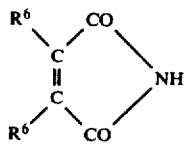

XXXI where each $R^6$ has the meaning previously assigned.
Suitable 3-substituted acrylic acids are of formula

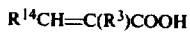

$$R^{14}CH{=}C(R^3)COOH \qquad \text{XXXII}$$

where $R^3$ and $R^{14}$ have the meaning previously assigned.

Polyepoxides which may be employed to react with the phenolic or alcoholic hydroxyl, or carboxylic acid, or imido groups are preferably those containing groups of formula I.

As examples of such polyepoxides may be mentioned the epoxide resins listed above as suitable components in the resin compositions used in the process of this invention.

Reaction may be effected in the absence or presence of a solvent and at ambient or elevated temperature, preferably at 50° to 150° C. A catalyst such as a quaternary ammonium compound, a tertiary amine, a thioether or a sulphonium salt is usually added, as is a free radical inhibitor such as hydroquinone.

Typical such dual-functional substances are described in U.S. Pat. No. 3,450,613 and in West German Offenlegungsschrift No. 2,342,407.

The preferred dual-functional substances hence contain in the same molecule at least one group of formula I directly attached to an oxygen, nitrogen, or sulphur atom, and at least one group of formula

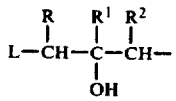

XXXIII directly attached to an oxygen, nitrogen, or sulphur atom,
where
$R$, $R^1$, and $R^2$ are as hereinbefore defined, and
L is the monovalent photopolymerisable residue of a substance after removal of a hydrogen atom attached directly to an oxygen, nitrogen, or sulphur atom, such as a group of any of formulae II to XI and XV.

Preferred groups L include any of formulae II to IV and VI, and the following formulae

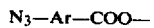

$$N_3{-}Ar{-}COO{-} \qquad \text{XXXIV}$$

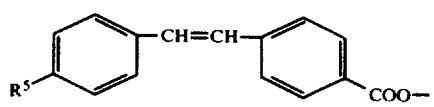

XXXV

-continued

XXXVI

$$R^6\text{-}C(CO)_2\text{N-}R^{22}\text{-COO-}$$

XXXVII

(structure: two phenyl rings $R_a^8$ substituted, connected by Y, with O— substituent)

(structure: Z-heterocycle-Y-phenyl($R_a^8$)-O—)

XXXVIII

$$R^6\text{-}C(CO)_2\text{N-}R^{23}\text{-O-}$$

XXXIX

(structure: pyridone-like ring with $R_a^7$, N-$R^{23}$-O—, C=O)

XL

$$R^6\text{-}C(CO)_2\text{N-}$$

XLI and $$R^{14}CH=C(R^3)COO-\quad\quad XLII$$

where Ar, $R^5$-$R^8$, $R^{14}$, $R^{22}$, $R^{23}$, a, b, Y, and Z have the meanings previously assigned.

Another method of making dual-functional compounds, by introducing an epoxide group or groups into a compound having at least one photopolymerisable group, comprises utilising one which has also at least one alcoholic or phenolic hydroxyl, or a carboxyl, group and treating it such that the group or groups is or are converted into 1,2-epoxide groups, using methods known in the art of epoxide resins for converting hydroxyl or carboxyl groups into glycidyl ether or ester groups. For example, the compound is caused to react with epichlorohydrin in the presence of a hydrogen chloride acceptor (usually a strong base, e.g., NaOH) and preferably of a catalyst such as a quaternary ammonium compound, a tertiary amine, a thioether, or a sulphonium salt. Usually an excess of epichlorohydrin over the theoretical quantity required is employed, the excess serving as solvent for the reaction, which is normally carried out at a temperature of 30° to 120° C., preferably 40° to 65° C., and usually under reduced pressure in order to remove the water formed during the reaction.

Examples of dual-functional substances so obtainable are glycidyl esters of formula $$CH_2=C(R^3)COOCH_2CH\overset{O}{\underset{}{\diagup\diagdown}}CH_2\quad\quad XLIII$$

and $$R^{14}CH=(R^3)COOCH_2CH\overset{O}{\underset{}{\diagup\diagdown}}CH_2\quad\quad XLIV$$

where $R^3$ and $R^{14}$ each have the meanings previously assigned,
such as glycidyl acrylate, methacrylate, cinnamate, 3-(2-furyl)-acrylate, and sorbate.

Examples of other dual-functional substances similarly obtainable are glycidyl esters of azidoaromatic acids, of formula $$N_3ArCOOCH_2CH\overset{O}{\underset{}{\diagup\diagdown}}CH_2\quad\quad XLV$$

where Ar has the meaning previously assigned, and
glycidyl ethers of monohydroxyphenyl chalcones and chalcone-like substances, having the general formula (structure XLVI: two phenyl rings with $R_a^8$, $R_b^8$ substituents, connected by Y, with $OCH_2CH\overset{O}{\diagup\diagdown}CH_2$)

or (structure XLVII: Z-heterocycle-Y-phenyl($R_b^8$)-$OCH_2CH\overset{O}{\diagup\diagdown}CH_2$)

where $R^8$, Y, Z, a, and b have the meanings previously assigned.

Preferably the photopolymerisable compound is irradiated in the presence of a photopolymerisation catalyst. Suitable catalysts are well known and are described in, for example, the book by Kosar cited above.

Like the photopolymerisable compounds, the catalysts fall into two main classes (a) those which, on irradiation, give an excited state that leads to formation of free radicals which then initiate polymerisation of the monomer (photoinitiators) and (b) those which, on irradiation, give an excited state which in turn transfers its excitation energy to a monomer molecule, giving rise to an excited monomer molecule which then crosslinks with an unexcited monomer molecule (photosensitisers).

The first class includes organic peroxides and hydroperoxides, α-halogen substituted acetophenones such as 2,2,2-trichloro-4'-tert.butylacetophenone, benzoin and its alkyl ethers, e.g., the n-butyl ether, benzophenones, O-alkoxycarbonyl derivatives of an oxime of benzil or of 1-phenylpropane-1,2-dione, such as benzil (O-ethoxycarbonyl)-α-monoxime and 1-phenylpropane-1,2-dione-2-(O-ethoxycarbonyl)oxime, benzil acetals, e.g., its dimethyl acetal, and mixtures of phenothiazine dyes (e.g., methylene blue) or quinoxalines (e.g., metal salts of 2-(m- or p-methoxyphenyl)quinoxaline-6'- or 7'-sulphonic acids) with electron donors such as sodium benzenesulphinate or other sulphinic acid or a salt thereof, an arsine, a phosphine, or thiourea (photoredox systems), these initiators being used with unsaturated esters, especially acrylates and methacrylates, and also acrylamides.

The second class includes 5-nitroacenaphthene, 4-nitroaniline, 2,4,7-trinitro-9-fluorenone, 3-methyl-1,3-diaza-1,9-benzanthrone, and bis(dialkylamino)benzophenones, especially Michler's ketone, i.e., bis(p-dimethylamino)benzophenone.

Suitable photopolymerisation catalysts are readily found by routine experimentation. The catalyst must not, of course, give rise to a substantial degree of photoinduced polymerisation through consumption of epoxide groups nor should any other substance present: further, the photopolymerisation catalyst must not cause curing of the epoxide resin such that the epoxide resin does not remain substantially thermosettable.

Generally, 0.1 to 20%, and preferably 0.5 to 15%, by weight of the photopolymerisation catalyst is incorporated, based on the combined weight of the photopolymerisable compound and, if used, the dual-functional substance.

In the photopolymerising step actinic radiation of wavelength 200–600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable compound will depend upon a variety of factors which include, for example, the individual compound used, the amount of that compound on the reinforcement, the type of light source, and its distance from the impregnated material. Suitable times may be readily determined by those familiar with photopolymerisation techniques, but in all cases the product after photopolymerisation must still be curable by heating: for this reason, photopolymerisation is carried out at temperatures below those where curing of the epoxide resin by the heat-activated curing agent becomes substantial.

Suitable heat-activated curing agents include polycarboxylic acid anhydrides, dicyandiamide, complexes of amines, such as solely tertiary amines, with boron trifluoride or boron trichloride, latent boron difluoride chelates, aromatic polyamines, and imidazoles such as 2-ethyl-4-methylimidazole. When the epoxide resin is an N-glycidyl compound, the curing agent is preferably not a boron halide complex. The heat-curing agent is usually dissolved or suspended in the liquid composition before impregnation of the reinforcement.

The temperatures and duration of heating required for the thermal curing and the proportions of curing agent are readily found by routine experimentation and easily derivable from what is already well known concerning the heat-curing of epoxide resins.

The photopolymerisable compound, epoxide resin, the thermallyactivated curing agent, and, if used, the catalyst for the photopolymerisation and the dual-functional substance, are preferably applied so that the prepreg contains a total of from 20 to 80% by weight of the said components, and, correspondingly, 80 to 20% by weight of the reinforcement. More preferably, a total of 30 to 50% by weight of these components and 70 to 50% by weight of the reinforcement are employed.

Products made in accordance with the present invention may be in the form of flat sheets or shaped articles.

As already indicated, the components of the film are caused to flow about the fibrous reinforcing material by applying heat and/or pressure. Heated platens or pairs of rollers may be used, for example, and in the latter case, when unidirectional fibres are used, a rolling pressure may be applied in the direction of the fibre alignment. In place of pairs of rollers, the assembly may be passed under tension around part of the periphery of a single roller.

The film may be provided with a strippable backing sheet, e.g., of a polyolefin or a polyester, or of cellulosic paper having a coating of a silicone as release agent, on the face opposite to that brought into contact with the fibrous reinforcement. Manipulation of the assembly is often easier if the film has a tacky surface. This may be produced by coating the film with a substance which is tacky at room temperature but which cures to a hard, insoluble, infusible resin under the conditions of heat employed to cure the epoxide resin component of the film. However, an adequate degree of tackiness often exists without additional treatment, especially if the epoxide resin is not too far advanced.

The prepreg may be made by a batch process, the fibrous reinforcing material being laid on the film of the photopolymerised composition which is advantageously under slight tension, then a second such film may, if desired, be laid on top and then the assembly is pressed while being heated.

The prepregs may also be made continuously, such as by contacting the fibrous reinforcing material with the film of the photopolymerised composition, then, if desired, placing a second such film on the reverse face of the fibrous reinforcing material and applying heat and pressure. More conveniently, two such films, preferably supported on the reverse sides by belts or strippable sheets, are applied simultaneously to the fibrous reinforcing material so as to contact each exposed face. When two such films are applied, they may be the same or different.

Multilayer prepregs may be made by heating under pressure interleaved films and layers of one or more fibrous reinforcing materials.

When unidirectional fibres are used as the reinforcement material, successive layers of them may be oriented to form cross-ply prepregs. With the fibrous reinforcing material there may be used additional (non-fibrous) types of reinforcement such as a foil of a metal (e.g., aluminium, steel, or titanium) or a sheet of a plastics material (e.g., an aromatic or aliphatic polyamide, a polyimide, a polysulphone, or a polycarbonate) or of a rubber (e.g., a neoprene or acrylonitrile rubber).

The following Examples illustrate the invention. Temperatures are in degrees Celsius and, unless otherwise indicated, parts are by weight. Epoxide contents were determined by titration against a 0.1 N solution of perchloric acid in glacial acetic acid in the presence of excess of tetraethylammonium bromide, crystal violet being used as the indicator. All interlaminar shear strengths quoted are the mean of three results and were determined by ASTM method D 2344-72; flexural strengths are also the mean of three results and were determined according to BS 2782, Method 304B.

EXAMPLE 1

To a mixture of 50 g of a commercially-available sample of 1,3-diglycidyl-5,5-dimethylhydantoin (epoxide content 7.1 equiv./kg), 0.1 g of tetramethylammonium chloride, and 0.1 g of hydroquinone, stirred at 120°, was added 12.75 g of acrylic acid (0.5 equiv. per epoxide equiv.) over 30 minutes. The mixture was stirred for a further 30 minutes at 120°, by which time the epoxide content had fallen to 2.96 equiv./kg.

The product consists essentially of a mixture of dual-functional compounds, viz., 1-glycidyl-3-(3-acryloxy-2-hydroxypropyl)-5,5-dimethylhydantoin and 1-(3-acryloxy-2-hydroxypropyl)-3-glycidyl-5,5-dimethylhydantoin, the unchanged epoxide starting material, and also 1,3-bis(3-acryloxy-2-hydroxypropyl)-5,5-dimethylhydantoin.

Benzil dimethyl acetal (2%) was dissolved in the above product, and then dicyandiamide (4%) was milled in, using a triple roll mill. A film 0.0025 cm thick was produced from this composition by coating siliconised paper with it and irradiating with a 500 watt medium pressure mercury vapour lamp at a distance of 15 cm for 60 seconds. The film was used to impregnate glass cloth (square weave) at 120° to form a prepreg.

A 6-ply glass cloth laminate was prepared by heating 15 cm-square pieces of the prepreg at 170° for 1 hour under a pressure of 2.1 MN/$m^2$. It consisted of 51% of resin and 49% of glass, and its interlaminar shear strength was 17.7 MN/$m^2$.

EXAMPLE 2

To 3000 g of phenyl glycidyl ether (epoxide content 6.16 equiv./kg) containing 9 g of tetramethylammonium chloride and 6 g of 2,6-di-t-butyl-p-cresol, stirred at 100°, was added 1332 g of acrylic acid over one hour. The mixture was stirred at 100° for a further 4 hours, by which time the epoxide content was 0.91 equiv./kg and the viscosity was 60 cP at 25°, to yield 3-phenoxy-2-hydroxypropyl acrylate.

This acrylate was mixed with a diglycidyl ether of 2,2-bis(p-hydroxyphenyl)propane advanced with 2,2-bis(4-hydroxyphenyl)propane having an epoxide content of 2.2 equiv./kg, in the ratio of 30:70 respectively, and to this mixture were added dicyandiamide (4%), N-(p-chlorophenyl)-N,N'-dimethylurea as accelerator (1%), and benzil dimethyl acetal (1%). This liquid composition was used to make a film by coating siliconised paper with the composition (36μ thick) and irradiating for 30 seconds with a 400 w high pressure metal halide quartz arc lamp providing radiation primarily in the 365 nm waveband. The film was then used to prepare a unidirectional carbon fibre prepreg by pressing a layer on both sides of carbon fibres (unidirectional, 134 tows/cm, weight of tow 0.2 g/m) at 120° for 5 minutes under an applied presure of 0.07 MN/$m^2$.

A 4-ply laminate was produced by pressing four 10 cm-square pieces of the prepreg (all with the fibres in the same direction) at 120° for one hour at an applied pressure of 1.4 MN/$m^2$. The laminate, which consisted of 30% resin, had a flexural strength of 211 MN/$m^2$. Crossply laminates of higher flexural strength could be produced similarly.

EXAMPLE 3

Example 2 was repeated but using glass rovings(weighing 500 g per 10,000 meters, coated with a water-resistant silicone, 3.15 rovings per cm) in place of the carbon fibres.

A five-ply laminate was prepared by pressing five 20 cm-square pieces of prepreg (all with rovings in same direction) at 120° for one hour at a pressure of 0.7 MN/$m^2$. The laminate was heated at 180° for one further hour. The laminate, which consisted of 51% resin and 49% glass, had a flexural strength of 160 MN/$m^2$. Crossply laminates of substantially higher flexural strength could be prepared similarly.

EXAMPLE 4

To a stirred mixture of 100 g of polyethylene glycol (having an average molecular weight of 200), 110 g of triethylamine and 500 ml of toluene at room temperature was added 130.5 g of sorboyl chloride over 30 minutes. The mixture was then stirred at 80° for 1 hour, cooled, and filtered. Removal of the solvent under reduced pressure gave the desired polyoxyethylene disorbate.

This sorbate was mixed with an epoxide resin of epoxide content 2.2 equiv./kg obtained by advancing the diglycidyl ether of 2,2-bis(p-hydroxyphenyl) propane with 2,2-bis(3,5-dibromo-4-hydroxyphenyl)propane, in the ratio of 30:70 respectively and to this were added boron trifluoride-ethylamine complex (3%) and Michler's ketone (1%).

This liquid composition was used to make a film as described in Example 2 except that the irradiation time was 15 minutes. The film was then used to prepare a prepreg using carbon fibres as described in Example 2. A four ply laminate was made by pressing four 10 cm square pieces of the prepreg (all with fibres in same direction) at 150° for one hour at a pressure of 1.4 MN/$m^2$. The latter, which consisted of 25% resin, had a flexural strength of 531 MN/$m^2$.

EXAMPLE 5

Example 4 was repeated but using glass rovings employed in Example 3 in place of the carbon fibres.

A five ply laminate was prepared by pressing five 20 cm-square pieces of the unidirectional prepreg (each alternate layer at right angles with respect to the direction of the rovings) at 150° for one hour at a pressure of 0.7 MN/$m^2$. The laminate was then heated one further hour at 180°. The laminate, which consisted of 40% resin and 60% glass, had a flexural strength of 1017 MN/$m^2$.

What is claimed is:
1. A method for the preparation of prepregs which comprises
    (i) exposing to actinic radiation a layer of a liquid composition containing
        (a) an epoxide resin
        (b) a photopolymerisable compound, the molar ratio of a:b being from 10:1 to 1:10, and
        (c) a heat-activated curing agent for epoxide resins, until the said composition solidifies to form an essentially solid continuous film due to photopolymerisation of the said photopolymerisable compound while the epoxide resin remains substantially in the thermosettable state, and
    (ii) bringing together the film so formed and fibrous reinforcing material under conditions such that the said film flows about the fibers and the components of the said film and the fibers form a coherent structure.

2. The method of claim 1, in which the epoxide resin, the photopolymerisable compound, and the said curing agent together constitute from 20 to 80% by weight of the prepreg.

3. The method of claim 1, in which the epoxide resin contains at least one group of formula

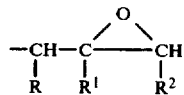

directly attached to an atom of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

4. The method of claim 1, in which the photopolymerisable compound is photopolymerised through a free-radical chain reaction.

5. The method of claim 1, in which the photopolymerisable compound is photopolymerised by reaction of an excited molecule of the monomer with an unexcited molecule of the monomer.

6. The method of claim 4, in which the photopolymerisable compound has one ethylenic linkage, or, providing they are unconjugated, more than one.

7. The method of claim 6, in which the photopolymerisable compound is an acrylic ester containing at least one group of formula $$CH_2=C(R^3)COO—$$

or $$[CH_2=C(R^3)CONH]_2CHCOO—$$

or $$CH_2=C(R^3)CONHCH(OH)CH_2COO—$$

where $R^3$ is a hydrogen, chlorine, or bromine atom, or an alkyl hydrocarbon group of 1 to 4 carbon atoms.

8. The method of claim 5, in which the photopolymerisable compound has at least two groups which are azido, coumarin, stilbene, maleimide, pyridinone, chalcone, propenone, pentadienone, or acrylic acid groups which are substituted in their 3- position by groups having ethylenic unsaturation or aromaticity in conjugation with the ethylenic double bond of the acrylic group.

9. The method of claim 8, in which the photopolymerisable compound contains at least two groups of the formula $$N_3Ar—$$

where Ar denotes a divalent mononuclear or dinuclear aromatic radical containing from 6 to 14 carbon atoms.

10. The method of claim 8, in which the photopolymerisable compound contains at least two groups of the formula

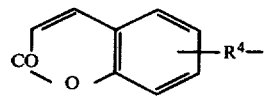

where $R^4$ is an oxygen atom, a carbonyloxy group (—COO—), a sulfonyl group, or a sulfonyloxy group.

11. The method of claim 8, in which the photopolymerisable compound contains at least two groups of the formula

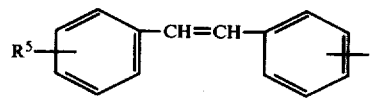

where $R^5$ is the residue, containing not more than 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus.

12. The method of claim 8, in which the photopolymerisable compound contains at least two groups of the formula

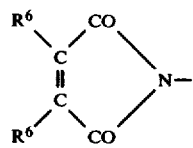

where each $R^6$ is an alkyl group of 1 to 4 carbon atoms, a chlorine atom, or a phenyl group.

13. The method of claim 8, in which the photopolymerisable compound contains at least two groups of the formula

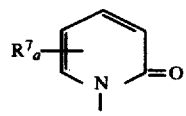

where $R^7$ is an aliphatic or cycloaliphatic radical of 1 to 8 carbon atoms, and a is zero or an integer of 1 to 4.

14. The method of claim 8, in which the photopolymerisable compound contains at least two groups of the formula

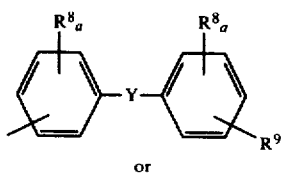

or

-continued

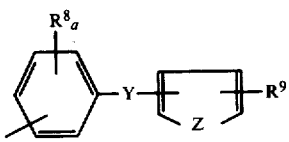

where
each $R^8$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulfonic, or phosphoric acid group in the form of a salt, a is zero or an integer of 1 to 4, $R^9$ represents a valence bond or a hydrogen atom, Y represents a chain of carbon atoms containing in that chain a grouping of formula

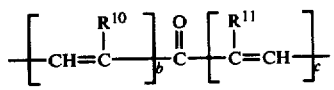

or

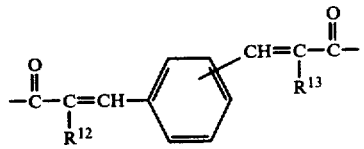

or

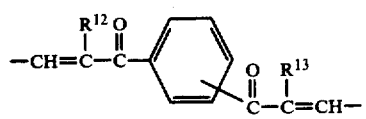

$R^{10}$ and $R^{11}$ each each individually a hydrogen atom, an alkyl group of 1 to 4 carbon atoms, or an aryl group, or $R^{10}$ and $R^{11}$ conjointly denote a polymethylene chain of 2 to 4 methylene groups, $R^{12}$ and $R^{13}$ are each a hydrogen atom, an alkyl group of 1 to 4 carbon atoms, or an aryl group, b and c are each zero, 1, or 2, with the proviso that they are not both zero, and Z is an oxygen or sulfur atom.

15. The method of claim 8, in which the photopolymerisable compound contains at least two groups of the formula

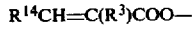

where
$R^{14}$ is an aliphatic or mononuclear aromatic, araliphatic, or heterocyclyl group which has ethylenic unsaturation or aromaticity in conjugation with the ethylenic double bond shown, and $R^3$ is a hydrogen, chlorine, or bromine atom, or an alkyl hydrocarbon group of 1 to 4 carbon atoms.

16. The method of claim 1, in which the heat-activated curing agent is a polycarboxylic acid anhydride, dicyandiamide, a complex of an amine with boron trifluoride or boron trichloride, a latent boron difluoride chelate, an aromatic polyamine, or an imidazole.

17. The method of claim 1, in which the photopolymerisable compound does not contain a 1,2-epoxide group.

18. The method of claim 1, in which the fibrous reinforcing material is also impregnated with a dual-functional substance having in the same molecule both at least one 1,2-epoxide group and at least one dissimilar group through which the substance is polymerised by means of actinic radiation.

19. The method of claim 18, in which the dual-functional substance contains in the same molecule at least one group of formula

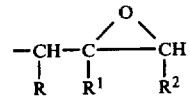

directly attached to an atom of oxygen, nitrogen, or sulfur, and at least one group of formula

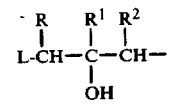

directly attached to an atom of oxygen, nitrogen, or sulfur, where

L is the monovalent photopolymerisable residue of a substance after removal of a hydrogen atom attached directly to an oxygen, nitrogen, or sulfur atom, and either R and $R^2$ each represent a hydrogen atom, in which case $R^1$ denotes a hydrogen atom or a methyl group, or R and $R^2$ together represent —CH$_2$CH$_2$—, in which case $R^1$ denotes a hydrogen atom.

20. The method of claim 1, in which the components of the said film are caused to flow about the fibers by applying heat.

21. The method of claim 1, in which the components of the said film are caused to flow about the fibers by applying pressure.

* * * * *